(12) United States Patent
Fiaschi et al.

(10) Patent No.: US 11,929,929 B2
(45) Date of Patent: Mar. 12, 2024

(54) METHODS, APPARATUS AND COMPUTER PROGRAMS FOR ALLOCATING TRAFFIC IN A TELECOMMUNICATIONS NETWORK

(71) Applicant: Telefonaktiebolaget LM Ericsson (publ), Stockholm (SE)

(72) Inventors: Giovanni Fiaschi, Sollentuna (SE); Francesco Davide Calabrese, Solna (SE); Daniele Ceccarelli, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 493 days.

(21) Appl. No.: 17/289,904

(22) PCT Filed: Nov. 2, 2018

(86) PCT No.: PCT/EP2018/080040
§ 371 (c)(1),
(2) Date: Apr. 29, 2021

(87) PCT Pub. No.: WO2020/088780
PCT Pub. Date: May 7, 2020

(65) Prior Publication Data
US 2022/0006741 A1    Jan. 6, 2022

(51) Int. Cl.
*H04L 47/12* (2022.01)
*H04L 47/10* (2022.01)
*H04W 24/02* (2009.01)

(52) U.S. Cl.
CPC ............. *H04L 47/12* (2013.01); *H04W 24/02* (2013.01)

(58) Field of Classification Search
CPC ......... H04L 47/12; H04L 47/10; H04W 24/02
See application file for complete search history.

(56) References Cited

U.S. PATENT DOCUMENTS

| 7,289,821 B2 * | 10/2007 | Kim ..................... H04L 12/423 455/512 |
| 9,465,902 B1 * | 10/2016 | Brugada ............... G06F 30/327 |

(Continued)

FOREIGN PATENT DOCUMENTS

| JP | 4768192 B2 | 9/2011 |
| WO | 2019097006 A1 | 5/2019 |
| WO | 2019120551 A1 | 6/2019 |

OTHER PUBLICATIONS

First Examination Report dated Feb. 17, 2022 for Indian Patent Application No. 202117020171, 5 pages.

(Continued)

*Primary Examiner* — Harry H Kim
(74) *Attorney, Agent, or Firm* — Sage Patent Group

(57) ABSTRACT

One aspect of the disclosure provides a method for allocating traffic in a telecommunications network. The telecommunications network comprises a plurality of nodes, with pairs of nodes being connected by respective links. A plurality of demands for connectivity between respective first nodes and respective second nodes are allocated to the telecommunications network, with traffic for each demand being directed via a respective plurality of paths between the respective first and second nodes in accordance with respective weights assigned to each path. The method comprises: determining a criticality of each link forming a path of the plurality of paths for a demand of the plurality of demands, the criticality of a link varying as a function of a utilization of that link at a non-constant gradient between a minimum value at a first value of the utilization and a maximum value at a second value of the utilization, wherein the second value corresponds to a utilization which is over a capacity of the link: determining a criticality of the path as a function of the criticality of the links forming the path: and determining the (Continued)

weight for allocation of traffic to the path as a function of the criticality of the path.

20 Claims, 6 Drawing Sheets

(56) References Cited

U.S. PATENT DOCUMENTS

| | | | | |
|---|---|---|---|---|
| 10,685,563 | B2* | 6/2020 | Edwards | .......... G08G 1/096791 |
| 10,929,038 | B1* | 2/2021 | Wang | .................... G06F 9/4881 |
| 2003/0227924 | A1 | 12/2003 | Kodialam et al. | |
| 2004/0196787 | A1 | 10/2004 | Wang et al. | |
| 2017/0331694 | A1* | 11/2017 | Crickett | .............. H04L 41/0836 |
| 2017/0366467 | A1* | 12/2017 | Martin | ................ H04L 12/4625 |

OTHER PUBLICATIONS

Eppstein, David, "Finding the k Shortest Paths", SIAM Journal on Computing, vol. 28, No. 2, 1998 Society for Industrial and Applied Mathematics, 1998, 652-673.

Villamizar, Curtis, "OSPF Optimized Multipath (OSPF-OMP)", Internet Engineering Task Force, Internet-Draft, draft-ietf-ospf-omp-02,, Feb. 24, 1999, 1-38.

Zhang, Junjie, et al., "Optimizing Network Performance using Weighted Multipath Routing", 2012 International Conference on Computer Communications and Networks, 2012, 1-7.

* cited by examiner

METHODS, APPARATUS AND COMPUTER PROGRAMS FOR ALLOCATING TRAFFIC IN A TELECOMMUNICATIONS NETWORK

TECHNICAL FIELD

Embodiments of the present disclosure relate to telecommunication networks, and particularly relate to methods, apparatus and computer program products for allocating traffic among possible paths through a telecommunications network.

BACKGROUND

The problem of traffic routing in a network has been the subject of research for many years, and involves selecting a path for traffic in a network. Routing is performed for many types of networks, including circuit-switched networks and packet-switched networks. Conventional approaches to routing generally involve the assessment of multiple possible paths between two nodes of the network (e.g. an ingress or source node and an egress or destination node), and the selection of one particular path for the traffic based on some metric or cost criteria. For example, the shortest path may be selected, or the path leading to minimal cost.

However, this approach may not always lead to the optimal solution for the traffic, or for the network as a whole. For example, a demand for connectivity may specify one or more constraints to be satisfied by the network (e.g., a maximum latency). If a particular path satisfies the constraints, it may be beneficial for the network to allocate traffic to the particular path even if the path is not otherwise "optimal" in the sense of being shortest, minimal cost etc.

A paper by Junjie Zhang et al ("Optimizing Network Performance using Weighted Multipath Routing", International Conference on Computer Communications and Networks, 2012) describes a method which seeks to minimize the average packet delay over a network. However, the approach set out in the paper suffers from a number of disadvantages. The delay function is defined for each link only up to the link's full capacity. However, in practice the link capacity is able to be exceeded (e.g., through queuing data packets prior to transmission over the link) and for some high-traffic scenarios it may be necessary to allow for this to obtain an optimal traffic routing solution. Further, the approach adopted to find an optimal solution in the paper is adapted from the Simulated Annealing algorithm. However, this algorithm can be complex, and require many iterations to converge to an optimal or near-optimal solution.

SUMMARY

It is an object of embodiments of the disclosure to overcome these and other problems in the art.

One aspect of the disclosure provides a method for allocating traffic in a telecommunications network. The telecommunications network comprises a plurality of nodes, with pairs of nodes being connected by respective links. A plurality of demands for connectivity between respective first nodes and respective second nodes are allocated to the telecommunications network, with traffic for each demand being directed via a respective plurality of paths between the respective first and second nodes in accordance with respective weights assigned to each path. The method comprises: determining a criticality of each link forming a path of the plurality of paths for a demand of the plurality of demands, the criticality of a link varying as a function of a utilization of that link at a non-constant gradient between a minimum value at a first value of the utilization and a maximum value at a second value of the utilization, wherein the second value corresponds to a utilization which is over a capacity of the link; determining a criticality of the path as a function of the criticality of the links forming the path; and determining the weight for allocation of traffic to the path as a function of the criticality of the path.

Further aspects provide apparatus and machine-readable mediums for performing the method described above. For example, in one aspect, the disclosure provides a network management node for allocating traffic in a telecommunications network. The telecommunications network comprises a plurality of nodes, with pairs of nodes being connected by respective links. A plurality of demands for connectivity between respective first nodes and respective second nodes are allocated to the telecommunications network, with traffic for each demand being directed via a respective plurality of paths between the respective first and second nodes in accordance with respective weights assigned to each path. The network management node comprises processing circuitry and a non-transitory machine-readable medium storing instructions which, when executed by processing circuitry, cause the network management node to: determine a criticality of each link forming a path of the plurality of paths for a demand of the plurality of demands, the criticality of a link varying as a function of a utilization of that link at a non-constant gradient between a minimum value at a first value of the utilization and a maximum value at a second value of the utilization, wherein the second value corresponds to utilization which is over a capacity of the link; determine a criticality of the path as a function of the criticality of the links forming the path; and determine the weight for allocation of traffic to the path as a function of the criticality of the path.

Another aspect provides a computer program product comprising a non-transitory machine-readable medium storing instructions which, when executed by processing circuitry of a network management node, causes the network management node to: determine a criticality of each link forming a path of the plurality of paths for a demand of the plurality of demands, the criticality of a link varying as a function of a utilization of that link at a non-constant gradient between a minimum value at a first value of the utilization and a maximum value at a second value of the utilization, wherein the second value corresponds to utilization which is over a capacity of the link; determine a criticality of the path as a function of the criticality of the links forming the path; and determine the weight for allocation of traffic to the path as a function of the criticality of the path.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
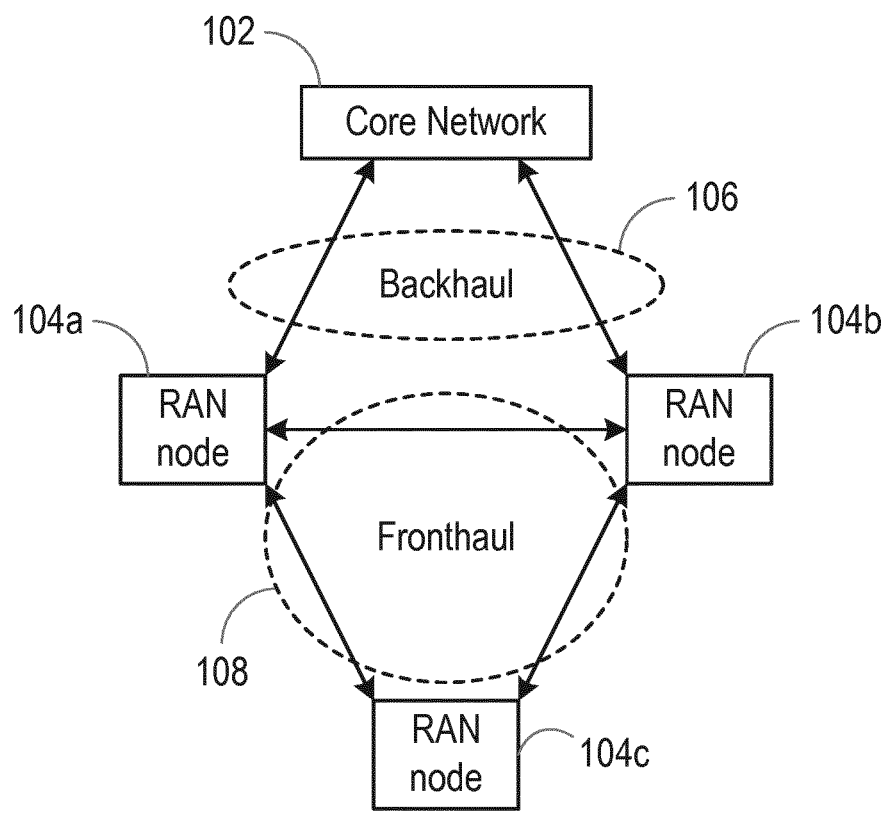
FIG. 1 is a schematic diagram of a telecommunications network.

FIG. 1 shows a telecommunications network 100 in which embodiments of the disclosure may be implemented according to one example.

The network 100 may implement any suitable standard for the provision of radio communications. For example, the network 100 may implement a cellular telecommunications standard, such as those which have been developed, or are being developed, or will be developed, by the $3^{rd}$ Generation Partnership Project (3GPP). Such standards include Global System for Mobile Communications (GSM) including General Packet Radio Service (GPRS) and Enhanced Data Rates for GSM Evolution (EDGE), Universal Mobile Telecommunications Systems (UMTS) including High Speed Packet Access (HSPA), Long Term Evolution (LTE) including LTE Advanced and LTE Advanced Pro, and the fifth generation (5G) standard currently under development, New Radio (NR).

The network 100 comprises a core network 102 and a radio access network (RAN) comprising a plurality of RAN nodes 104a, 104b, 104c (collectively 104). One or more of the RAN nodes 104 are connected to the core network 102 via a backhaul network 106. The RAN nodes 104 are connected to each other via a fronthaul network 108. Aspects of the disclosure may apply to any part of a telecommunications network.

The RAN nodes 104 may comprise base stations, nodeBs, eNodeBs or gNodeBs (the latter being the nomenclature currently used in the developing 5G standard). It will further be appreciated by those skilled in the art that the functions of RAN nodes may be distributed across multiple entities and/or multiple sites. Not all of those entities may have connectivity to the core network 102. For example, the functions of a RAN node may be distributed between a central unit (CU) and one or more distributed units (DUs) also known as Radio Units (RUs).

The fronthaul network 108 thus provides connectivity between nodes 104 of the radio access network. Such connectivity may be required in multiple scenarios. For example, while in a dual connectivity mode, a user equipment (UE) may have multiple connections to RAN nodes 104 active at the same time (e.g. multiple DUs and/or multiple base stations). Close co-ordination may be required between the RAN nodes 104 to prevent collision of transmissions to the UE, duplication of transmissions, etc. In other examples, the functions of RAN nodes may be distributed or split across multiple entities or sites, with the fronthaul network 108 providing connectivity between those distributed entities and/or sites.

The nature of traffic allocated to the fronthaul network 108 may therefore have the following characteristics:

It requires very strict latency constraints (e.g., tens of microseconds); and

Traffic from different users is prone to collision.

The first of these characteristics restricts the number of paths which satisfy the latency constraint. If a path through the fronthaul network 108 does not satisfy the latency constraint, it cannot be considered as an option for providing the requested connectivity. This may simplify the complexity of the route calculation problem.

The second of these characteristics may make it advantageous for traffic to be distributed across multiple paths, rather than allocated to a single "best" path. In the latter case, collision between traffic may result in significant degradation to the network performance, as the entire traffic for a particular demand is affected by the collision. If the traffic is distributed over multiple paths, a collision on any one of those paths is less likely and network performance is improved. At least some of the same characteristics are applicable to further parts of the network 100.

Figure 2:
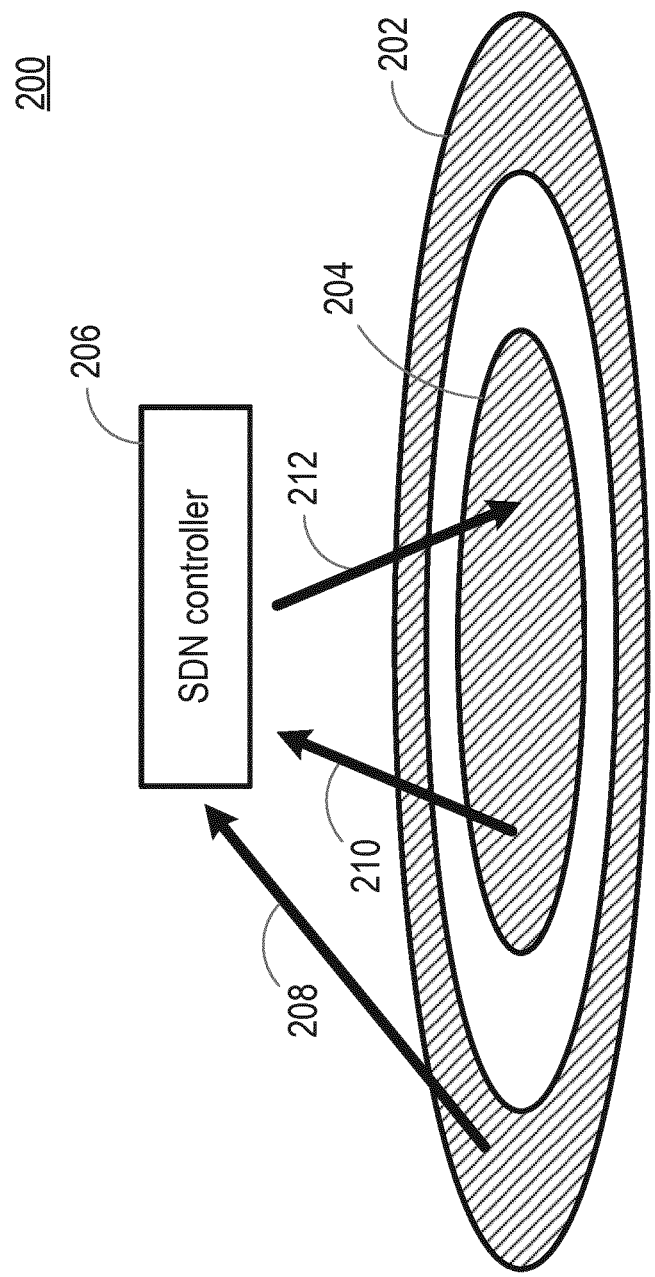
FIG. 2 is a schematic diagram of a traffic allocation system according to embodiments of the disclosure.

FIG. 2 is a schematic diagram of a traffic allocation system 200 according to embodiments of the disclosure. The system 200 comprises a client network 202 and a transport network 204 providing connectivity for the client network 202. In one particular embodiment, the client network 202 may comprise a radio access network such as that described above with respect to FIG. 1, while the transport network 204 may comprise the fronthaul network 108. However, in other embodiments, the embodiments of the disclosure may allocate traffic for any telecommunications network.

The transport network 204 comprises a plurality of nodes coupled to each other via respective links. A node may be connected to any number of other nodes of the network 204. In one example, the transport network 204 may utilize optical communication techniques, with the nodes comprising optical switches or other hardware and the links comprising optical links such as optical fibres.

A management node 206 for the system 200 is communicatively coupled to both the client network 202 and the transport network 204. The management node 206 may be a software defined networking (SDN) controller or SDN function, for example. The management node 206 is operative to receive connectivity demands from the client network 202, and allocate traffic for those connectivity demands to one or more paths through the transport network 204. Further detail is provided below.

In step 210, the management node 206 obtains topology information for the transport network 204. For example, the topology information may comprise one or more of: identities of a plurality of nodes in the network; an indication of the links between respective pairs of the plurality of nodes (e.g., an indication as to which node identities are connected to which other node identities); an indication of the penalty associated with each link and/or node (e.g. latency); and an indication of the capacity of each link and/or node. The topology information may be visualized as a graph of nodes interconnected by links.

The management node 206 may further obtain, in step 210, an indication of the traffic usage over each link of the transport network 204. Note that the traffic usage over each link will be a sum of the traffic from all paths through the network 204 which utilize that link.

In step 208, the management node 206 obtains, from the client network 202, a plurality of demands for connectivity between nodes of the client network 202 or between attachment points of the transport network. Thus each connectivity demand may comprise identities of a first node (e.g. a source or ingress node) and a second node (e.g., a destination or egress node), with traffic to be routed between those nodes via the transport network 204.

Each connectivity demand may further specify one or more constraints to be satisfied by the routing through the transport network 204. For example, the connectivity demand may specify a maximum latency to be associated with the routing. In this case, the constraint is satisfied by a particular path through the network 204 if the total latency of the path is less than the maximum latency. In examples where the transport network 204 comprises a fronthaul network (such as the network 108 described above with respect to FIG. 1), the maximum latency may be relatively short, e.g., tens of microseconds. In this context, the constraint may be specified by the user or client associated with the connectivity demand. In other embodiments, each connectivity demand may alternatively or additionally be associated with a constraint which is specified by an operator of the transport network 204.

For example, although optical fibres provide an excellent transmission medium with high bandwidth, optical signals will generally deteriorate as they cross optical links (e.g. fibres) and nodes (e.g. switches) owing to various effects such as group velocity dispersion, fibre loss, adjacent channel cross-talk, self phase modulation, etc. Eventually the optical signals may degrade to the point where they are unreadable. Where the transport network 204 comprises optical links and optical nodes, therefore, it may be beneficial to limit the light path length and convert the optical signals to electrical signals at certain points (before onward transmission as optical signals). A constraint may be associated with each connectivity demand defining a maximum light path length through the network before optical-to-electrical conversion.

Conversely, optical-to-electrical conversion is associated with increased cost in operating the transport network 204 (e.g. through the necessity of providing electro-optic converters, etc) and reduced capacity in the transport network (as the electro-optic converters may become bottlenecks for traffic passing through the network). A constraint may therefore be associated with each connectivity demand limiting the number of electro-optic converters in each path. For example, the constraint may define a maximum number of electro-optic converters per unit length within the path.

Further examples of possible constraints comprise a maximum number of crossed nodes within the path (e.g., to limit node resource usage or to limit the path length for path computation purposes), and a maximum number of segments used to express the path routing (e.g. after label stack optimization in a Segment Routing network). The latter constraint may be applicable particularly if the nodes or routers in the path have a limitation as to the label stack depth they are capable of processing.

Each connectivity demand may further be associated with or comprise an indication of the traffic usage for that connectivity demand (e.g., an amount of traffic which is to use the connectivity). For example, the traffic usage per demand may be measured by the client or the management node 204 where paths for the connectivity demand have already been established for a period of time (e.g. when the process described herein is used to update existing traffic allocations). The traffic usage may be an average of the traffic usage measured over a particular time window, for example. Thus, the management node may additionally receive in step 208 an indication of a measured amount of traffic flowing for each connectivity demand.

In step 212, the management node computes one or more paths satisfying the constraints for each connectivity demand, and determines weights according to which traffic for each connectivity demand should be allocated to each of the computed paths. In particular, embodiments of the disclosure provide for updating of the weights according to which traffic for each connectivity demand is allocated to each of the computed paths. These paths and their respective weights are provided to the transport network 204, and particularly to the first nodes (e.g., the source or ingress nodes), so that traffic for each demand can be allocated between one or more paths in accordance with the weights. Further detail regarding this and other aspects of the disclosure is provided below with respect to FIGS. 3 and 4.

Figure 3:
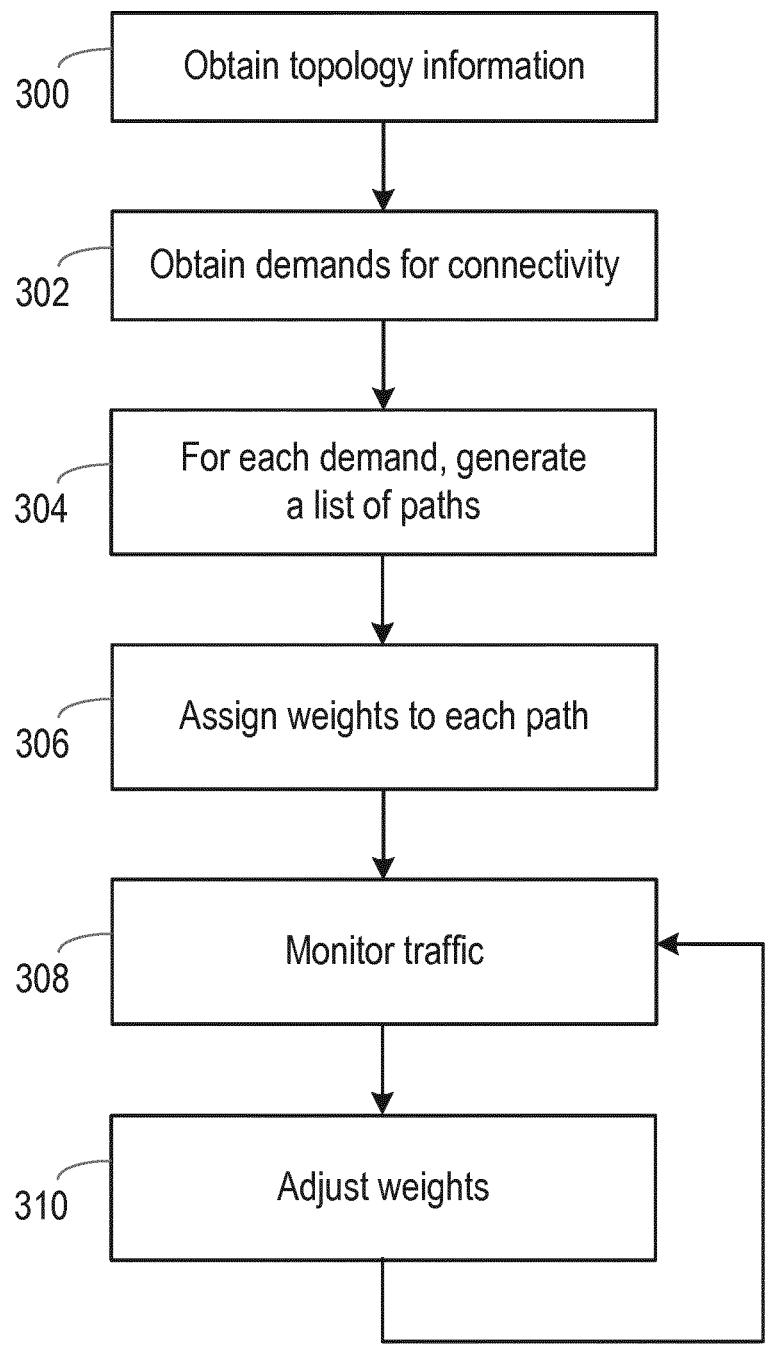
FIG. 3 is a flowchart of a method according to embodiments of the disclosure.

FIG. 3 is a flowchart of a method according to embodiments of the disclosure. The method may be performed in a management node for a telecommunications network, such as the SDN controller 206 described above with respect to FIG. 2.

In step 300, the management node obtains topology information for telecommunications network. This step may be largely similar to step 210 described above. Thus, in one embodiment, the topology information may comprise one or more of: identities of a plurality of nodes in the network; an indication of the links between respective pairs of the plurality of nodes (e.g., an indication as to which node identities are connected to which other node identities); an indication of the penalty associated with each link and/or node (e.g. latency, etc); and an indication of the capacity of each link and/or node. The management node may obtain such information through communications with the network itself (e.g. via one or more control interfaces between the management node and the network), or through receipt of configuration information from a designer or operator of the network. The topology information may be updated periodically or whenever a change is made to the network topology.

In the following the nodes are indicated with indices. A link connecting node i with node j is indicated with $l_{ij}$.

A link $l_{ij}$ has capacity $c(l_{ij})$, which can be expressed e.g. as its bandwidth in bits per second.

A link $l_{ij}$ has penalty penalty($l_{ij}$), which can be expressed in different units of measure (e.g., seconds or submultiples for time penalties, e.g., delay or latency).

A node i may also have a penalty penalty(i) in the same unity of measure as the link penalty. For example, packets crossing routers may experience some latency.

In this example, the penalty is assumed to be additive, that is to say, the resulting penalty of crossing one or more links and one or more nodes is the sum of their individual penalties. For example, penalties such as latency may be additive. Those skilled in the art will appreciate that different penalties may accumulate in different and/or non-linear ways. For example, optical impairments may accumulate in a non-linear fashion. The present disclosure is not limited in that respect.

In step 302, the management node obtains a plurality of demands for connectivity over the network. This step may be largely similar to step 208 described above. Thus the plurality of demands for connectivity may relate to connectivity between nodes of a client network or between attachment points of a transport network. Each connectivity demand may comprise or be associated with identities of a first node (e.g. a source or ingress node) and a second node (e.g., a destination or egress node), with traffic to be routed between those nodes via the transport network 204. Each connectivity demand may further be associated with one or more constraints to be satisfied by the routing through the telecommunication network (e.g., one or more of the constraints described above), and an indication of traffic usage of the connectivity.

The connectivity demand between nodes i and j is indicated with $d_{ij}$. The connectivity demand $d_{ij}$ may be associated with a measured usage $u(d_{ij})$. The connectivity demand $d_{ij}$ may further be associated with a maximum acceptable penalty max_penalty($d_{ij}$) (i.e., a constraint). A path may not be selected for the demand if it exceeds that maximum acceptable penalty.

Connectivity usages need to be comparable among each other (e.g., use the same or similar units), and similarly link capacities need to be comparable among each other. However, it will be understood by those skilled in the art that connectivity usage and link capacity may not need to be directly comparable with each other, i.e. defined using the same or similar units.

The information for a connectivity demand may be sent by a client network to the management node, e.g., as in step 208 described above.

In step 304, the management node generates, for each connectivity demand, a list of possible paths through the telecommunications network from the first node to the second node which satisfy the constraint or constraints (e.g. a maximum latency). In one embodiment, the management node calculates all non-looping paths which satisfy the constraint or constraints.

In this context, a path $p_k(d_{ij})$ for demand $d_{ij}$ is defined as the set of adjacent nodes and links it crosses. The penalty of a path is the sum of the penalties of all nodes and links it crosses. $P(d_{ij})$ is the set of paths satisfying the requirements for $d_{ij}$.

There are several possibilities to compute the paths satisfying a certain connectivity demand (the $P(d_{ij})$ set above). Two examples include breadth-first search (BFS) and depth-first search (DFS) algorithms. In the former case, the searching algorithm starts at a tree root (e.g., the first node) and explores neighbor nodes first, before moving to the next level neighbours. In the latter case, the algorithm again starts at a tree root, but explores as far as possible along each branch before backtracking. The following pseudo-code defines a breadth-first adaptation according to one embodiment:

```
01  function all_feasible_paths (network N, demand d from A to Z):
02      return solution_list
03
04      init empty solution_list
05      init empty queue Q
06      Q.enqueue(path(A)) //degenerate path with only node A
07
08      while Q is not empty
09          current_path = Q.dequeue
10              for each out_link from last_node(current_path) in N
11                  if latency(current_path) + latency(out_link) >
12                      max_latency(d):
13                      break //prune out_link
14                  if last_node(out_link) is in current_path:
15                      break //prune out_link, loop
16                  if last_node(out_link) == Z:
17                      add current_path + out_link to
    solution_list
18                  Q.enqueue(current_path + out_link)
```

In line 11, the latency is assumed to include the end nodes of all the paths. In line 17 and 18, the "+" operator indicates adding a link element and its terminating node to a path which is a set. The "if" statement at line 11 may prune many alternatives and keep the problem space and the complexity relatively low.

However, for large- or medium-sized networks, computing all the feasible paths $P(d_{ij})$ could be prohibitively complex.

The common way of computing paths in a network is by using a shortest path (minimal cost) algorithm. This computes only one path per demand and may easily lead to bottlenecks in case of unbalanced traffic on the demands and/or on the background.

The equal cost multi-path (ECMP) concept is also already used in IP networks. All the paths with minimal cost are used, if there are ties in the minimal cost calculation. While providing some alternatives, the number of paths per demand is not explicitly controllable. This number does not depend on the node distance and may be too low or too high for the network operation needs.

The k-shortest paths is a well-known extension of the shortest path algorithm, which that finds k paths (where k is an integer greater than one) between two nodes with non-increasing cost. Those skilled in the art will appreciate that several algorithms are known for computing the k shortest paths and the present disclosure is not limited in that respect. In one embodiment, the Eppstein algorithm may be used to discover the k shortest paths between a source node and a destination node satisfying a given constraint (e.g., as described in "Finding the k Shortest Paths", by David Eppstein, SIAM Journal on Computing, Volume 28, pp 652-673).

It will be noted that, if demands for traffic with different requirements (e.g., different constraints) are sent between the same endpoints, the set of paths for each demand may need to be calculated independently.

Thus the output of step 304 is a set of one or more paths for each connectivity demand, which satisfy the constraint(s) associated with that demand. These paths may be established in the network (e.g., as described above with respect to step 212).

In step 306, the management node assigns weights, for each demand, for each of the paths in the set (see also step 212 described above). The weight assigned to path $p_k$ is indicated by $w_k$. The sum of all weights for a demand may be constrained as equal to one, such that the traffic for a given demand is distributed over the set of paths found for that demand.

The weights initially assigned to each path for a demand in step 306 may be determined in any suitable manner. Later steps of the method set out a method for monitoring the traffic in the network and adjusting the weights so as to improve network performance. The weights may be adjusted iteratively until an optimal or near-optimal solution is found. Thus the weights which are assigned in step 306 are relatively unimportant and can be arbitrary, except that the closer those initial weights are to the optimal solution, the fewer the number of iterations that will be required when adjusting the weights later in the method.

In one embodiment, the weights for each demand are assigned in step 306 to be equal, such that the traffic for each demand is distributed evenly across each of the paths found for that demand. Alternatively, the weights assigned in step 306 may be determined using more sophisticated techniques, such as those described in PCT application no PCT/EP2017/084207.

In step 308, the management node monitors the traffic in the network as a result of the weights assigned in step 306. For example, the traffic associated with each demand may be measured, through communication with the client nodes (see step 210 described above). The traffic flowing in each of the links of the network may also be monitored, through communication with each of the nodes of the network (see step 208 described above). Alternatively, the traffic flowing in each of the links may be calculated, based on the traffic for each of the demands and the weights assigned in step 306. However, this latter approach does not take into account traffic flowing on the network which is outside the control of the management node. For example, the network infrastructure may be utilized by multiple virtual networks, with the management node able to control only the traffic for its respective virtual network. Measuring the traffic flowing in each link allows the traffic allocation strategy set out herein to take this external or "background" traffic into account.

In step 310 (see also step 212 described above), based on the traffic measured in step 308, the weights assigned in step 306 are adjusted so as to improve one or more performance criteria of the network (e.g. load balancing, traffic throughput, etc). Step 310 may comprise the adjustment of a single pair of weights (e.g., a reduction in the weight for one path of a demand, and a corresponding increase in the weight for another path of the same demand). The method returns to step 308, and the traffic continues to be monitored. Steps 308 and 310 may be repeated iteratively until some stopping criterion is reached.

Figure 4:
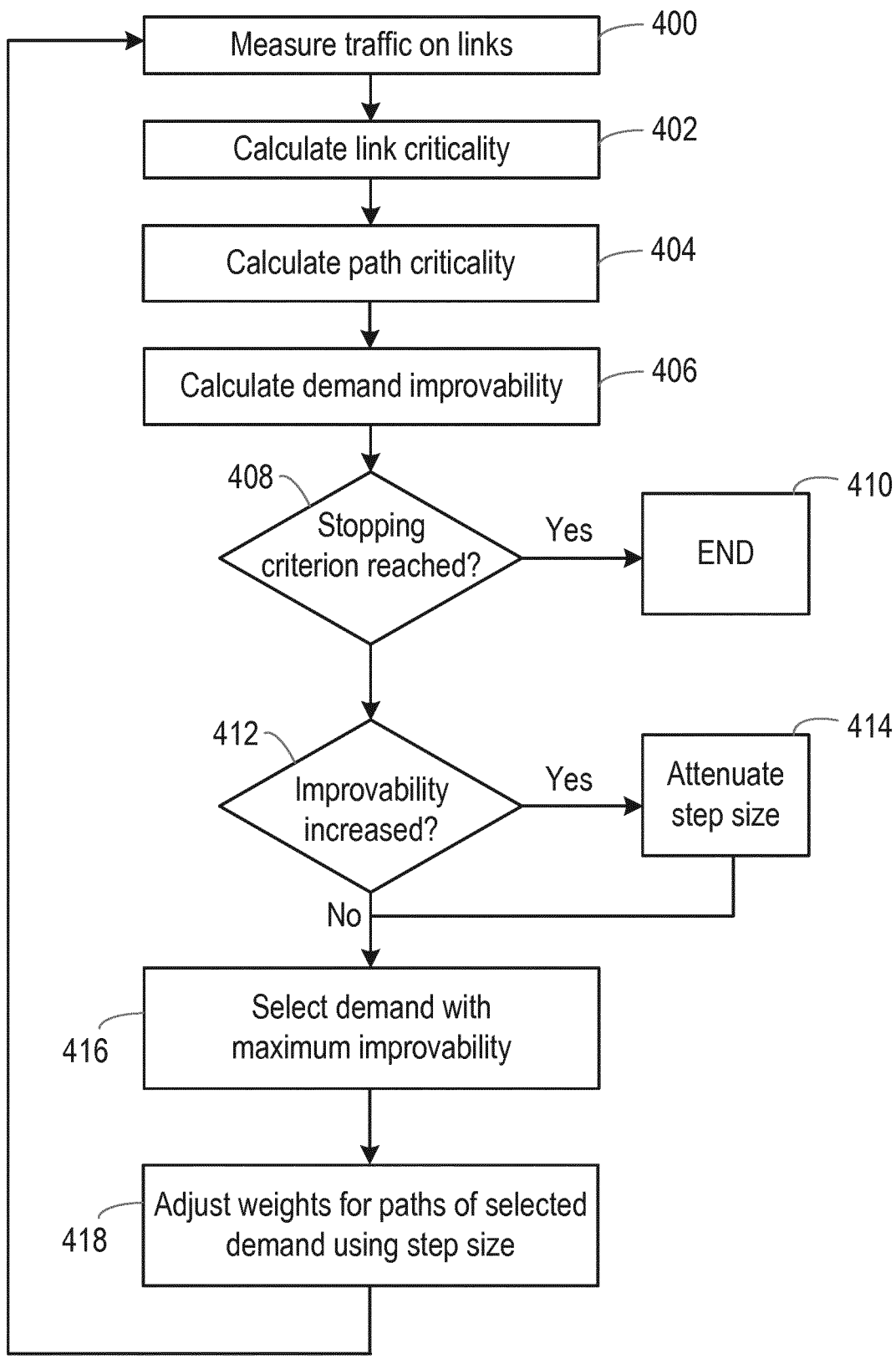
FIG. 4 is a flowchart of a method of adjusting weights according to embodiments of the disclosure.

FIG. 4 is a flowchart illustrating in more detail a method of adjusting the weights for distributing traffic over a plurality of paths of a network according to embodiments of the disclosure. The method may be employed by the management node in steps 308 and 310, described above with respect to FIG. 3.

The method begins in step 400, in which the management node measures the traffic on each of the links in the network. The traffic in each link may be reported directly to the management node by nodes of the network. Alternatively, the traffic in each link may be calculated based on the measured traffic associated with each demand (e.g., as reported by client nodes associated with the demand), and the weights assigned to each of the paths for each demand (e.g., in step 306). The traffic flowing in each link is the aggregate of the traffic flowing in each of the paths that traverse that link, and thus may comprise traffic from multiple demands. The measured traffic may be an average value, calculated over a defined time window.

As noted above, the weight assigned to path $p_k$ is indicated by $w_k$. A connectivity demand $d_{ij}$ sends a measured traffic $u(d_{ij})$. As a consequence, a path $p_k$ satisfying demand $d_{ij}$ carries traffic $u(p_k)=w_k \cdot u(d_{ij})$.

The traffic on a link $l_{ij}$ can be calculated as the sum of the usages of all paths crossing it plus the background traffic, $u(l_{ij})=\Sigma_{l_{ij} \in p_k} u(p_k)+bt_{ij}$. This traffic is also directly measured as stated above.

The utilization or load of a link $v(l_{ij})$ is a ratio between the traffic $u(l_{ij})$ flowing on that link and the capacity $c(l_{ij})$ of the link. As such, it is the amount of traffic on the link divided by the capacity of the link. Thus a link which is operating at full capacity (i.e. the amount of traffic flowing on the link is equal to the capacity of the link) has a utilization of 1 or unity. According to embodiments of the disclosure, the utilization can take values which are greater than 1, which is representative of a link that is overloaded, i.e. the traffic exceeds a full capacity of the link. Traffic which exceeds the capacity of the link may be held in a queue prior to transmission over the link, e.g. in a buffer.

To calculate the optimal weights, we first of all define the problem in such a way that it is well understood what is the desired status of the network that the calculation aims to achieve.

Embodiments of the disclosure define a criticality of each link and use the criticality, instead of the utilization $v(l_{ij})$ of each link, to determine and adjust or determine the weight assigned to each path flowing through the network. Thus, in step 402, the management node calculates the criticality of each link as a function of the utilization $v(l_{ij})$ of the link. Traffic routing is carried out on the basis of the calculated weight of each path of the network.

The criticality is a measure of the status of the link in dependence on the traffic flowing through that link. As said above, there is traffic crossing a link. While the traffic remains below the link capacity, the status of the link can be considered to be good. In some aspects, if the link has a low load, e.g. the link is at half capacity, the link can be considered as having a status which is slightly worse than if the link is completely empty, because there is a lower opportunity for future traffic accommodation. However, the network is still working without any negative effects, and thus the status of the link is not impaired as might be expected by the carrying of a substantial amount of traffic (e.g. half link capacity). The criticality value of the link is low at such moderate utilization levels, reflecting the low determined negative impact of the traffic.

When the traffic load approaches the link capacity, however, a negative impact on the ability of the link to carry the traffic is determined, and reflected in the determined criticality value. For example, as the traffic load approaches the link capacity, the queues begin to fill and/or initial congestion is experienced. Therefore, in a region close to the capacity of the link (e.g., between 0.8 and 1, or 80% and 100% utilization), the criticality is determined to rise sharply. Thus, the criticality reflects the impact of the traffic on a link/node, and not merely the amount of the traffic on the link/node.

In principle, the capacity of the link should not be exceeded, but the presence of queues (or buffers) allows some extra traffic to be absorbed for limited periods of time. Therefore, the criticality is defined for values of the utilization which are greater than unity, i.e. above nominal link/node capacity or over full capacity. This allows the network to route traffic on a link which is above the link (or node) maximum nominal capacity to carry traffic, if this is necessary. Further, for values of the utilization which are greater than unity, the criticality may take values which are below the maximum value of the criticality. In some aspects, the criticality has a minimum value at a first value of the utilization (e.g., a low value of utilization) and a maximum value at a second value of the utilization (e.g., a high value of utilization, greater than the first value). The second value of the utilization corresponds to a utilization which is over a full capacity of the link. As such, the criticality does not have a maximum value at a nominal maximum capacity of the link, but instead the criticality has a maximum value at a utilization which is above a nominal maximum (i.e. full) capacity of the link.

As such, for values of utilization above the link capacity, the link criticality continues to rise with increasing utilization. There is little capacity increase available through the use of queues, so the criticality values do not significantly increase further with additional utilization, seen as the criticality values flattening asymptotically towards the maximum value above full utilization. In other words, having the link overloaded at 150% or 200% of link capacity makes little difference. Between those example very high link utilizations, the criticality value will be at, or very near, its maximum.

Figure 5:
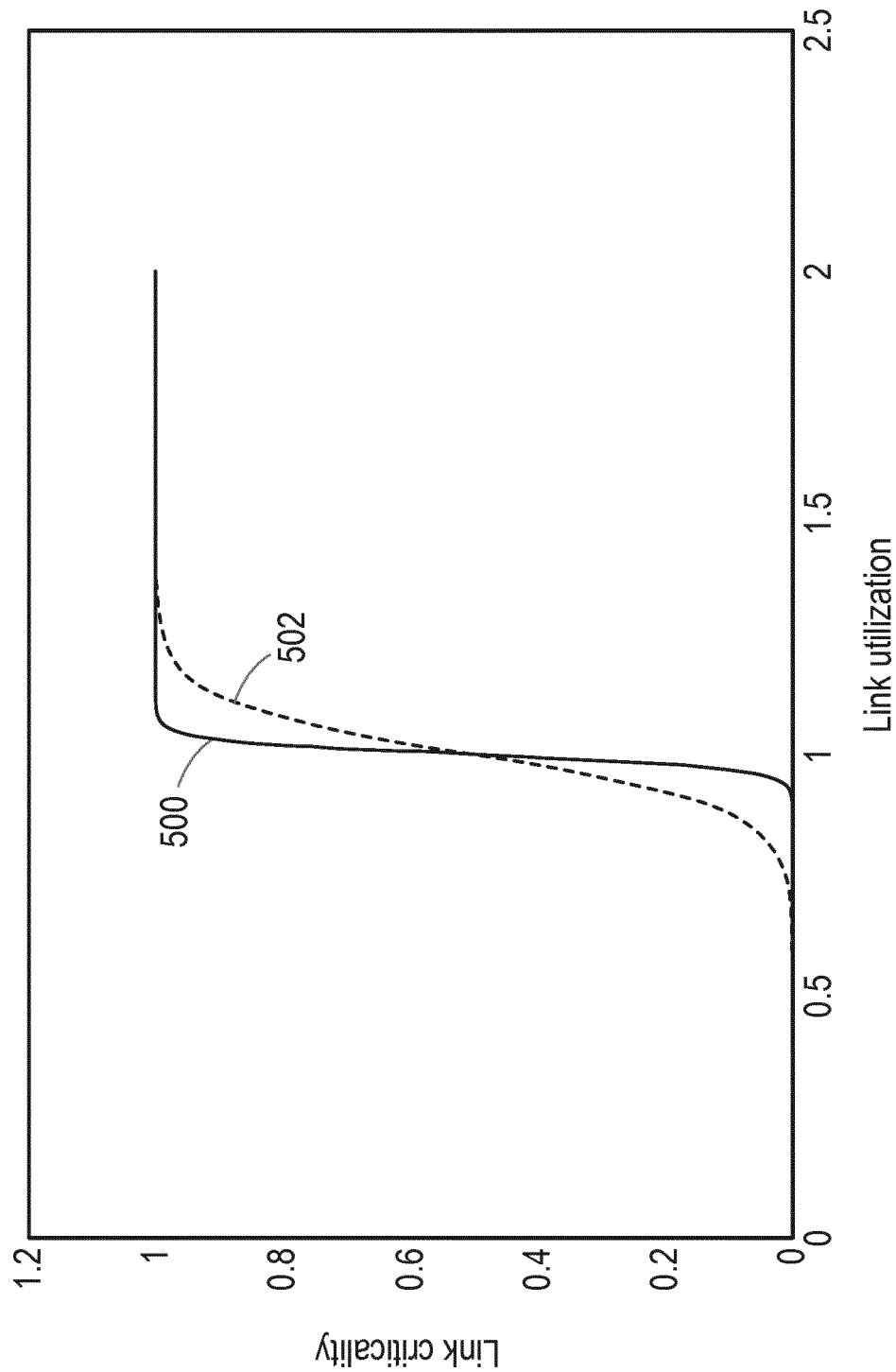
FIG. 5 is a graph showing the variation of link criticality with utilization according to embodiments of the disclosure.

FIG. 5 shows the variation of link criticality $s(l_{ij})$ with link utilization $v(l_{ij})$ according to an embodiment of the disclosure. Two functions are shown: a first function 500 and a second function 502.

Generally, determined criticality values increase as the utilization of the link (i.e. traffic load increases). For some ranges of the utilization the criticality may have a constant value (e.g. at low utilizations, e.g. below 50%). The determined criticality values, based the utilization by functions such as function 500, 502, provide for effective weighting of traffic routes so that traffic flow through the network is carried out effectively.

For both functions, as described above, it can be seen that the criticality varies, monotonically and with a non-constant gradient, between a minimum value and a maximum value as the link utilization increases. At low values of the utilization, the criticality varies with the utilization at a relatively low (or zero) gradient. In the illustrated embodiment, the criticality tends (asymptotically) towards its minimum value as the utilization approaches zero. Similarly, at high values of the utilization (above 1), the criticality also varies with the utilization at a relatively low (or zero) gradient. In the illustrated embodiment, the criticality tends (asymptotically) towards its maximum value as the utilization approaches infinity. In between those two regions, the criticality varies with the utilization at a relatively high gradient. In particular, the criticality increases with a relatively high gradient between utilization of around 0.8 (or 80%) and 1 (or 100%). This reflects the fact that the link rapidly moves from a situation in which operation of the link is normal (e.g., few or no packets experience additional delay), even at relatively high utilization, to one in which operation of the link is compromised (e.g., several or all packets experience additional delay) as the utilization approaches 1.

The above description can be mathematically quantified with an S-shaped or sigmoid function. The sigmoid function as a shape is well studied and those skilled in the art will appreciate that there are several functions with a sigmoid shape. The logistic function is one of the most common, defined as follows:

$$s = \frac{1}{1 + \exp(b \cdot (a - v))}$$

In this example, the criticality function s has two configurable parameters: the slope b and the intercept a. v is the link utilization, defined above. The slope determines how steep the curve is in proximity of the intercept, and the intercept determines where the gradient of the function is highest (e.g., the value of the utilization at which the criticality is equal to 0.5 in this specific example). The presence of one or more configurable parameters in the criticality function means that the determined criticality value can be tuned or optimized for a particular network or network type. Thus, for example, in an initial configuration phase, one or more configurable parameters can be determined which provide for the determined criticality values to accurately reflect the impact of traffic on the operation of the network. The functions 500 and 502 illustrated in FIG. 5 are both logistic functions. The function 500 has a slope of 70 and an intercept of 1. The function 502 has a slope of 18 and an intercept of 1.

Those skilled in the art will appreciate that the criticality may not be defined as a logistic function. For example, alternative sigmoid functions may include $$s = \frac{v}{\sqrt{(1 + v^2)}}.$$

The criticality may also not be defined as a conventional S-shaped or sigmoid function. For example, the example functions given above and with respect to FIG. 5 are all smoothly varying and differentiable. The criticality function may be defined differently, for example as a series of straight line curves for different regions of the utilization. In such an example, the criticality may be defined for relatively low values of the utilization as a straight line varying with a low or zero gradient at or near its minimum value, and for relatively high values of the utilization as a straight line varying with a low or zero gradient at or near its maximum value. In between those two regions (e.g., at least between values of utilization of around 0.8 and around 1), the criticality may be defined as a straight line varying with a relatively high gradient.

In another example, values of the criticality may be defined in a look-up table, based on corresponding values of the utilization. The values of the criticality may be defined based on the utilization so as to approximate the functions described above.

The functions may comprise one or more parameters which are configurable by the network operators, e.g., to achieve a desired outcome or performance. For example, where the criticality varies as a logistic function of the utilization, one or more of the slope and the intercept may be configured by the network operator as desired. The intercept may be defined relatively low (e.g. a guard margin below 1) such that the traffic flowing in the link preferably never reaches capacity, or that the usage of queues and buffers is reduced. Alternatively, the intercept may be defined relatively high (e.g. above 1), if the network operator wishes to accommodate large amounts of traffic. Similarly, the slope can be made steeper (i.e. a higher gradient on a graph of criticality value on the vertical axis and link utilization on the horizontal axis) if the type of traffic transmitted over the network is particularly sensitive to latency.

In FIG. 5, the minimum values of the criticality are equal to or approach zero. According to an embodiment of the disclosure, however, the minimum value of the criticality (e.g., as the utilization approaches or is equal to zero) is non-zero. It will be understood from the discussion below that a link which has zero criticality is unlikely to effect the allocation of weights to paths through the network. A non-zero criticality, even at low values of utilization, allows the weights to be optimized even when relatively little traffic is flowing in the network. For example, an offset may be applied to the criticality at low values of the utilization, or the function may be defined such that the criticality is equal to or tends towards a non-zero value as the utilization approaches zero.

It will be further noted that if the same function were used regardless of link capacity, links with smaller capacity would not be discouraged over links with larger capacity in cases of equal utilization. However, the smaller link has less spare capacity than the larger link. In order to counteract this effect, the criticality may be normalized based on the capacity of the link.

For example, where the criticality is defined using the logistic function, the following normalization can be adopted:

$$s = \frac{1}{1 + \exp(b \cdot (a - v) \cdot c_i / c_{ref})}$$

where $c_i$ is the link capacity and $c_{ref}$ is a reference capacity for the whole network, e.g., the maximum or average link capacity. The effect of this normalization is to make the slope of the function less steep for the links with lower capacity (particularly in the vicinity of the intercept), and thus the criticality of a lower-capacity link lies above the criticality of a higher-capacity link at utilizations below the intercept, and beneath the criticality of the higher-capacity link at utilizations above the intercept.

One aim of the method of FIG. 4 may be to minimize the sum of the link criticalities in the network.

In step 404, the management node determines the path criticality for each path, for each demand. The path criticality may be defined as a sum of the criticalities of each link which the path crosses. Thus the output of step 404 is a set of path criticalities for each demand, the set of path criticalities comprising a path criticality for each path defined for the demand.

In step 406, the management node determines the improvability of each demand. The improvability relates to the amount by which the path criticalities of the paths for each demand can be improved or equalized, so that no path is more critical than another path for a given demand. In one embodiment, the demand improvability for a particular demand is defined as the difference in criticality between the path for the demand having non-zero weight and maximum criticality, and the path for the demand having minimum criticality. Thus the output of step 406 is an improvability value for each demand.

The method then proceeds to evaluate stopping criteria and performance improvements, which are relevant only when the method is performed iteratively. For the purposes of this description, we assume that the stopping criteria are not met for a first iteration of the method, and thus the description of the method now moves to step 416, in which the demand with the maximum improvability is selected. In step 418, the weights for the paths of that selected demand are adjusted so as to decrease the improvability for that demand. One method of achieving that improvement is to reduce the weight for the path having the highest criticality (and non-zero weight) by a certain amount or step size, and to increase the weight for the path having the lowest criticality by the same amount or step size. The amount by which the weights are adjusted may vary as a function of the traffic for that demand. For example, the amount varies inversely proportionally to the traffic for the demand. The amount may be defined as:

$$\min(w(cp(d_{max})), \text{sensitivity} * impr/u(d_{max}))$$

So the amount is the minimum of the weight for the most critical path ($cp(d_{max})$), and the improvability for the demand divided by the traffic for the demand, multiplied by a constant sensitivity. The minimum function is present so that the weight is not reduced below zero. $d_{max}$ is the demand having highest improvability.

As the improvability is defined as the difference in criticality between these two paths, the improvability of the selected demand should decrease.

In the illustrated embodiment, the method is iterative, and thus the method moves from step 418 back to step 400, in which the traffic flowing in each link is measured again. In iterations which are subsequent to the first iteration (as here), this step may involve the calculation of the traffic flowing in each link based on the previously measured values and the changes to the weights made in step 418, rather than re-measurement of the traffic flowing in all links of the network.

In steps 402, 404 and 406, the criticality of the links of the network, the path criticalities, and the improvabilities of the demands are re-calculated.

In step 408 (description of which was omitted above for the first iteration), the management node determines whether a stopping criterion has been reached. For example, one stopping criterion may be a maximum number of iterations. This embodiment may be particularly suited for networks in which the amount of traffic flowing for each demand, or the background traffic, varies relatively rapidly. Thus, particularly where link traffic is not re-measured for subsequent iterations, the method stops when the maximum number of iterations is reached, and before the amount of traffic flowing in the network changes significantly. In another embodiment, the stopping criterion may comprise a determination that the highest improvability for all demands in the network is below a threshold. In this latter embodiment, the method stops when the criticality of all paths for each demand have been equalized, such that one path is not significantly more critical than another path for the same demand.

In the event that the stopping criterion is reached, the method ends in step 410. If the weights have not yet been output for implementation in the network (see FIG. 6 below), the weights are output from the management node to the network, such that traffic for each demand can be routed through the network in accordance with the weights.

If the stopping criterion has not been reached, the method proceeds to step 412, in which the management node determines whether the adjustment to the weights made in step 418 resulted in an increase to the highest value of improvability of the demands in the network. For example, in a previous iteration, suppose that the improvability of Demand A is 0.78, and that the improvability of Demand B is 0.7. Demand A is therefore selected and the weights of its paths adjusted in step 418. This reduces the improvability of Demand A to 0.6, but increases the improvability of Demand B to 0.84. The maximum improvability across the network has actually increased as a result of the changes made in step 418. If the maximum improvability has increased, the method proceeds to step 414, in which the step size (the amount by which the weights are adjusted in step 418) is attenuated. For example, the constant sensitivity, defined above, may be attenuated. The attenuation may be implemented by multiplying the constant by an attenuation factor, which is a positive number less than 1 (such that the step size cannot be negative). The attenuated step size is then used in step 418 to adjust the weights of the demand having highest improvability. If the maximum improvability has not increased (as determined in step 412), the step size is not attenuated, and the method proceeds directly to steps 416 and 418.

It will be noted that, in embodiments where the minimum value of the criticality is non-zero but the gradient of the criticality is zero (i.e. flat) as the utilization approaches zero, when the load in the network is low the path criticality for each path will correspond to the non-zero value multiplied by the number of links that the path traverses. Thus longer paths will have higher criticality than shorter paths. In such embodiments, the method may alter the weights so as to increase the weights for shorter paths and lower the weights for longer paths. At low network load, this approaches a shortest path allocation.

In embodiments where the criticality varies with a non-zero gradient as the utilization approaches zero, even when the load in the network is low, the criticality for each path is dependent on the utilization of each link that the path traverses. In this embodiment, the weights for shorter paths may again be increased while the weights for longer paths may be decreased; however, a greater proportion of traffic may be allocated to longer paths than in the case where the gradient of the criticality is zero as the utilization approaches zero. The value of the gradient of the criticality as the utilization approaches zero may be configured or tuned so as to achieve a desired performance at low network load.

Thus the disclosure provides a simple heuristic method by which an empirical definition of network improvability is given and the weights are changed pairwise to simplify the procedure.

Figure 6:
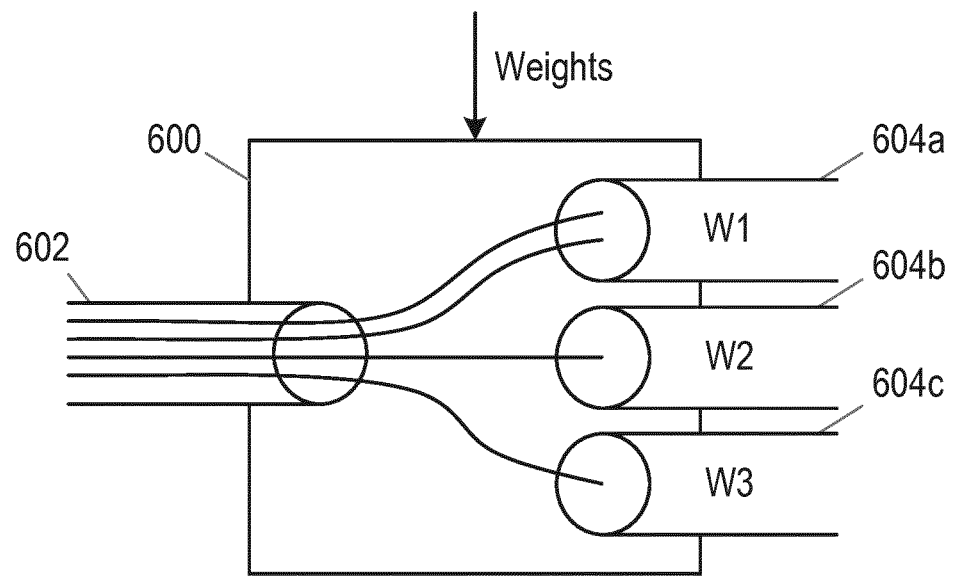
FIG. 6 is a schematic diagram showing distribution of traffic according to embodiments of the disclosure.

FIG. 6 is a schematic diagram showing distribution of traffic in a network node 600 according to embodiments of the disclosure. The network node 600 may be any suitable node providing routing of traffic over one or more links to one or more other network nodes in a telecommunications network. For example, the network node 600 may comprise a switch. In one embodiment, the network comprises an optical network, with the links comprising optical links such as optical fibres.

As noted above, the network node 600 receives weights from the management node calculated, for example, in accordance with the methods described above with respect to FIGS. 3 and 4. The network node 600 also comprises an input traffic link 602 and one or more output traffic links 604a, 604b, 604c (collectively, 604). The input traffic link 602 may comprise an interface with a demanding party of client (e.g. in a client network). The output traffic links 604 may comprise links to one or more other nodes in the network (e.g., in a transport network).

The demand for connectivity may comprise a plurality of data flows. The illustrated example shows a single demand comprising four data flows. However, each demand may comprise any number of data flows. Moreover, the node may in general receive or process traffic for multiple demands.

FIG. 6 further assumes that each of the output traffic links 604 defines a particular possible path for the traffic. The node may additionally have output links over which no path is possible or convenient for the demand.

Traffic is allocated to the different paths in accordance with the weights $w_1$, $w_2$ and $w_3$. In the illustrated example, two flows are allocated to link 604a, one flow is allocated to link 604b, and one flow is allocated to link 604c. In a scenario in which each of the flows comprises a similar amount of traffic, this implies the following weights:

$$w_1 = 0.5$$

$$w_2 = 0.25$$

$$w_3 = 0.25$$

In allocating the flows to the different paths, the node 600 may determine the entire path for the traffic flow at the point of transmission over the respective output links 604. In this way, other intermediate nodes on the path need not perform any traffic allocation method or apply any weights; rather the intermediate nodes simply relay the traffic according to the path which is already determined for it (e.g. through information contained in the traffic header). Further, if two paths for a particular demand overlap partially (e.g. the paths are not identical but comprise one or more links in common with each other), the two paths may be treated independently of each other. The intermediate node at which the paths diverge from each other may not "split" the combined traffic for both paths, but rather treats each path (or rather the flows allocated to each path) separately.

Figure 7:
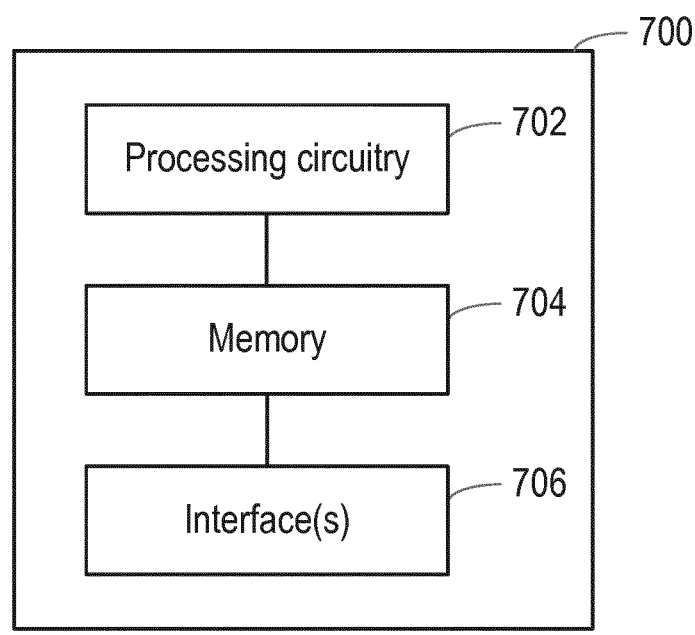
FIG. 7 is a schematic diagram of a network management node according to embodiments of the disclosure.

FIG. 7 is a schematic diagram of a network management node 700 according to embodiments of the disclosure. The network management node 700 may be operable as the management node 206 shown in FIG. 2, for example. The network management node 700 may be operable to perform the methods according to FIGS. 3 and 4.

The network management node 700 comprises processing circuitry 702 and a non-transitory machine-readable medium (such as memory) 704.

The machine-readable medium 704 stores instructions which, when executed by the processing circuitry 702, cause the network node 700 to: determine a criticality of each link forming a path of the plurality of paths for a demand of the plurality of demands, the criticality of a link varying as a function of a utilization of that link at a non-constant gradient between a minimum value at a first value of the utilization and a maximum value at a second value of the utilization, wherein the second value is representative of utilization over full capacity of the link and is greater than the first value; determine a criticality of the path as a function of the criticality of the links forming the path; and adjust the weight for allocation of traffic to the path as a function of the criticality of the path.

The management network node 700 may further comprise one or more interfaces 706, providing interfaces for the transmission and/or reception of signals via any suitable modality. For example, the interfaces 706 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The processing circuitry 702, machine-readable medium 704 and interfaces 706 may be coupled to each other in any suitable manner. For example, although FIG. 7 shows the components coupled together in series, it will be understood by those skilled in the art that the components may be coupled together in an alternative manner, such as via a bus.

The network management node 700 may alternatively be defined in terms of hardware and/or software modules configured to perform the steps of the methods described herein. For example, the network management node 700 may alternatively or additionally comprise: a first module configured to determine a criticality of each link forming a path of the plurality of paths for a demand of the plurality of demands, the criticality of a link varying as a function of a utilization of that link at a non-constant gradient between a minimum value at a first value of the utilization and a maximum value at a second value of the utilization, wherein the second value is representative of utilization over full capacity of the link and is greater than the first value; a second module configured to determine a criticality of the path as a function of the criticality of the links forming the path; and a third module configured to adjust the weight for allocation of traffic to the path as a function of the criticality of the path.

As used herein, the term 'module' shall be used to at least refer to a functional unit or block of an apparatus or device. The functional unit or block may be implemented at least partly by dedicated hardware components such as custom defined circuitry and/or at least partly be implemented by one or more software processors or appropriate code running on a suitable general purpose processor or the like. In one embodiment, the modules are defined purely in hardware. In another embodiment, the modules are defined purely by software. A module may itself comprise other modules or functional units.

This software code may be stored in the device as firmware on some non-volatile memory e.g. EEPROM (to preserve program data when the battery becomes discharged or is removed for replacement).

Embodiments of the present disclosure thus provide apparatus, computer program products and methods for allocating traffic in a telecommunications network.

It should be understood—especially by those having ordinary skill in the art with the benefit of this disclosure—that that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element. Further embodiments likewise, with the benefit of this disclosure, will be apparent to those having ordinary skill in the art, and such embodiments should be deemed as being encompassed herein.

The invention claimed is:

1. A method for allocating traffic in a telecommunications network, the telecommunications network comprising a plurality of nodes, with pairs of nodes being connected by respective links, wherein a plurality of demands for connectivity between respective first nodes and respective second nodes are allocated to the telecommunications network, with traffic for each demand being directed via a respective plurality of paths between the respective first and second nodes in accordance with respective weights assigned to each path, the method comprising:
    determining a criticality of each link forming a path of the plurality of paths for a demand of the plurality of demands, the criticality of a link varying as a function of a utilization of that link at a non-constant gradient between a minimum value at a first value of the utilization and a maximum value at a second value of the utilization, wherein the second value corresponds to a utilization which is over a capacity of the link;
    determining a criticality of the path as a function of the criticality of the links forming the path; and
    determining the weight for allocation of traffic to the path as a function of the criticality of the path.

2. The method according to claim 1, further comprising:
    for each demand, determining a criticality of each path of the respective plurality of paths;
    determining an improvability of each demand, based on a difference in criticality between a most-critical path of the respective plurality of paths for the demand and a least-critical path of the respective plurality of paths for the demand; and
    determining one or more weights assigned to the plurality of paths for the demand having a highest value of improvability.

3. The method according to claim 2, wherein determining one or more weights comprises:
    reducing a weight for allocation of traffic to the most-critical path of the respective plurality of paths; and
    increasing a weight for allocation of traffic to the least-critical path of the respective plurality of paths.

4. The method according to claim 2, wherein the steps of determining a criticality of each path of the respective plurality of paths for a demand,
    determining an improvability of each demand, and
    determining one or more weights assigned to the plurality of paths for the demand having a highest value of improvability,
    are repeated iteratively until a stopping criterion is reached.

5. The method according to claim 1, wherein the criticality of a link is normalized with respect to a capacity of the link.

6. The method according to claim 1, wherein the criticality of a link varies as a function of the utilization of that link with a relatively low gradient at or near the first and second values of the utilization, and with a relatively high gradient in a region between the first and second values of the utilization.

7. The method according to claim 1, wherein the minimum value of the criticality is nonzero.

8. The method according to claim 1, wherein the criticality of a link varies as an S-shaped function of the utilization of that link.

9. The method according to claim 1, further comprising:
    measuring an amount of traffic over each link and determining the criticality of each as a function of the measured amount of traffic.

10. The method according to claim 1, wherein the telecommunications network comprises a fronthaul network providing connectivity between nodes of a radio access network.

11. The method according to claim 1, wherein the method is performed in a software-defined network controller for the telecommunications network.

12. A network management node, for allocating traffic in a telecommunications network, the telecommunications network comprising a plurality of nodes, with pairs of nodes being connected by respective links, wherein a plurality of demands for connectivity between respective first nodes and respective second nodes are allocated to the telecommunications network, with traffic for each demand being directed via a respective plurality of paths between the respective first and second nodes in accordance with respective weights assigned to each path, the network management node comprising processing circuitry and a non-transitory machine-readable medium storing instructions which, when executed by processing circuitry, cause the network management node to:
    determine a criticality of each link forming a path of the plurality of paths for a demand of the plurality of demands, the criticality of a link varying as a function of a utilization of that link at a non-constant gradient between a minimum value at a first value of the utilization and a maximum value at a second value of the utilization, wherein the second value corresponds to utilization which is over a capacity of the link;

determine a criticality of the path as a function of the criticality of the links forming the path; and determine the weight for allocation of traffic to the path as a function of the criticality of the path.

13. The network management node according to claim 12, wherein the network management node is further caused to:

for each demand, determine a criticality of each path of the respective plurality of paths;

determine an improvability of each demand, based on a difference in criticality between a most-critical path of the respective plurality of paths for the demand and a least-critical path of the respective plurality of paths for the demand; and determine one or more weights assigned to the plurality of paths for the demand having a highest value of improvability.

14. The network management node according to claim 13, wherein the network management node is caused to determine one or more weights by:

reducing a weight for allocation of traffic to the most-critical path of the respective plurality of paths; and increasing a weight for allocation of traffic to the least-critical path of the respective plurality of paths.

15. The network management node according to claim 14, wherein the weight for allocation of traffic to the most-critical path of the respective plurality of paths is reduced by an amount, and the weight for allocation of traffic to the least-critical path of the respective plurality of paths is increased by the same amount.

16. The network management node according to claim 13, wherein the network management node is caused to carry out the steps of determining a criticality of each path of the respective plurality of paths for a demand, determining an improvability of each demand, and determining one or more weights assigned to the plurality of paths for the demand having a highest value of improvability, iteratively until a stopping criterion is reached.

17. The network management node according to claim 12, wherein the criticality of a link varies as a function of the utilization of that link with a relatively low gradient at or near the first and second values of the utilization, and with a relatively high gradient in a region between the first and second values of the utilization.

18. The network management node according to claim 12, wherein the network management node is further caused to:

measure an amount of traffic over each link and determine the criticality of each as a function of the measured amount of traffic.

19. The network management node according to claim 12, wherein the criticality of a link varies as a function of a utilization of the link according to one or more configurable parameters.

20. The network management node according to claim 12, wherein the network management node is a software-defined network controller for the telecommunications network.

* * * * *